United States Patent [19]

Iden

[11] Patent Number: 4,817,419

[45] Date of Patent: Apr. 4, 1989

[54] FLUID PRESSURE SENSOR CIRCUIT

[75] Inventor: Lee J. Iden, Morristown, N.J.

[73] Assignee: Iden Industries, Inc., Millington, N.J.

[21] Appl. No.: 82,050

[22] Filed: Aug. 5, 1987

[51] Int. Cl.⁴ .............................................. G01M 19/00
[52] U.S. Cl. ...................................... 73/118.1; 73/725;
338/176; 338/202
[58] Field of Search ....................... 73/719, 118.1, 725,
73/734, 746, 753, 115, 754; 338/171, 202, 176,
39, 40, 41, 42

[56]         References Cited
         U.S. PATENT DOCUMENTS

| 2,447,780 | 8/1948  | Underwood et al. | 338/171 |
| 3,283,283 | 11/1966 | Denner et al.    | 338/41  |
| 3,346,830 | 10/1967 | Ankeny           | 73/734  |
| 3,504,324 | 3/1970  | Creager          | 73/725  |
| 4,205,296 | 5/1980  | Frey, Jr.        | 338/171 |
| 4,274,074 | 6/1981  | Sakamoto         | 338/176 |

*Primary Examiner*—Donald O. Woodiel
*Attorney, Agent, or Firm*—Thomas D. Hoffman

[57]            ABSTRACT

A sensor circuit on a face of a ceramic substrate providing reliable continuous monitoring of fluid pressure in a closed chamber, said circuit being used in combination with a wiper arm having two or more contacting points that passes over and maintains continuous electrical contact with conductor contact pads of the circuit and converts the position of the contacting points of the wiper arm to predetermined resistance values which are converted into fluid pressures in a closed chamber, for example, to record the oil pressure in an automobile crankcase.

41 Claims, 4 Drawing Sheets

FLUID PRESSURE SENSOR CIRCUIT

BACKGROUND

1. Field of Invention

This invention relates to a sensor circuit on a ceramic substrate providing reliable continuous monitoring of fluid pressure in a closed chamber. The circuit is used in combination with a wiper arm having two or more contacting points that passes over conductor contact pads of the circuit and converts the position of the contacting points of the wiper arm to predetermined resistance values which are converted into fluid pressures in a closed chamber, for example, to record the oil pressure in an automobile crankcase. The circuit contains means to maintain continuous electrical contact between at least one of the contacting points of the wiper arm and at least one conductor contact pad.

2. Prior Art

Existing circuit sensors, for example, that disclosed in United States Patent 4,667,518 use wiper arm means to convert a predetermined resistance value into a pressure value in an automobile crankcase. However vibration produced, for example, by the automobile engine can cause the wiper arm to jump off the the face of the sensor circuit, breaking the electrical contact and measurement of pressure. Overheating of sensor circuits has resulted in distortion or even interruption of electrical output.

It is an object of this invention to provide a thick film sensor circuit capable of continuous electrical contact between the wiper arm and contact pad conductors.

It is another object of this invention to provide a thick film sensor circuit design to dissipate the heat generated on the circuit safely over the maximum substrate surface area.

SUMMARY OF THE INVENTION

The present invention provides an electrical sensor circuit with resistors, contact pad conductors on a front face of a ceramic substrate, a connecting means for applying an external potential source comprising a wiper arm means and a means for maintaining continuous electrical contact between the wiper arm means and the contact pad conductors, which comprises:

(a) a substrate comprised of a ceramic material having a front face and a back face; and (b) a circuit permanently attached to the front face of said substrate comprising (i) connecting means for applying an external potential source comprising a wiper arm means having contacting point means; (ii) conductors as contact pads for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors; and (v) means for measuring resistance.

In a preferred embodiment, the present invention also provides an electrical sensor circuit with resistors, contact pad conductors on a front face of a ceramic substrate, a connecting means for applying an external potential source comprising a wiper arm means and the contact pad conductors, which comprises:

(a) a substrate comprised of a ceramic material having a front face and a back face; and (b) a circuit permanently attached to the front face of said substrate comprising (i) connecting means for applying an external potential source comprising a wiper arm means having contacting point means; (ii) conductors as contact pads for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous attachment between at least one contacting point means, the wiper arm means and at least one of said conductors; (v) one or two resistor(s) segments connecting one of said connecting means and the first of said conductor contact pads; and (vi) means for measuring resistance.

DETAILED DESCRIPTION OF INVENTION

While the invention will be described in connection with preferred embodiments, it is to be understood that it is not limited to the disclosed embodiments but is intended to cover various modifications and equivalent arrangements included within the spirit and scope of the appended claims.

Figure 1:
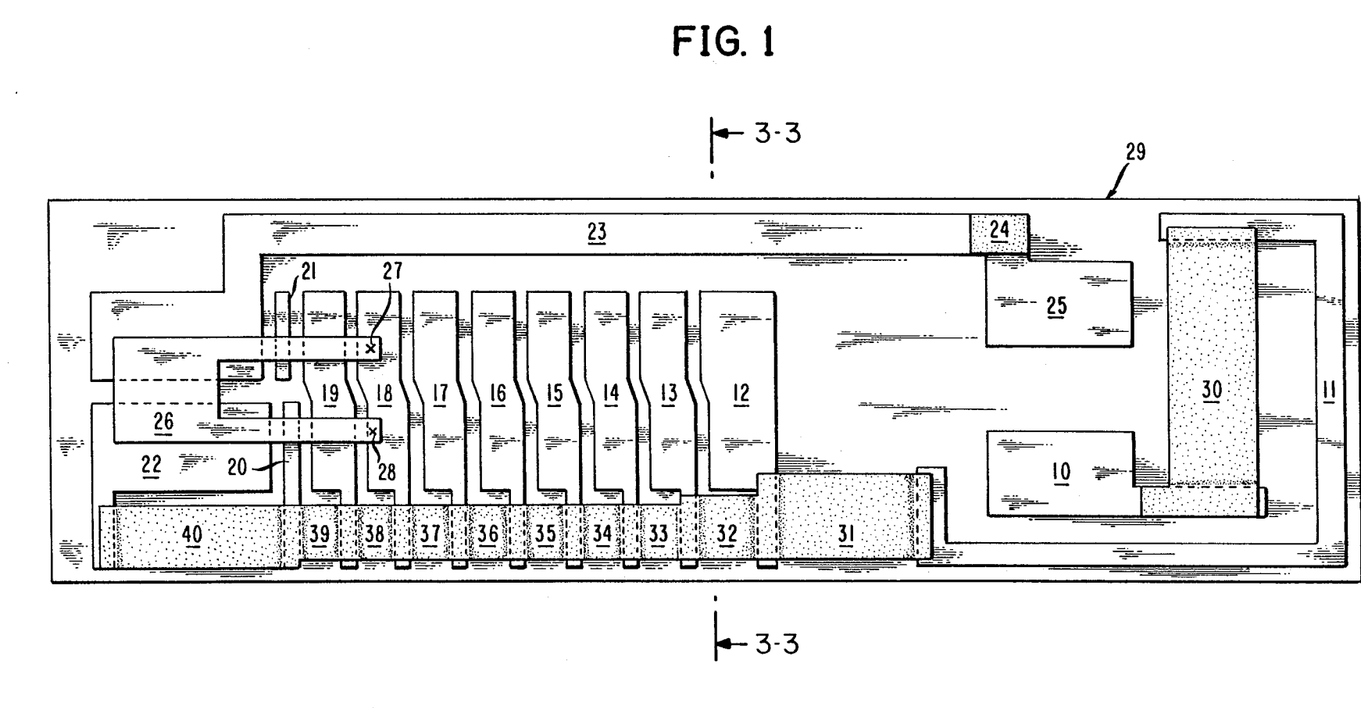
FIG. 1 is a top plan view of a preferred embodiment of the circuit of this invention on a substrate.
Figure 2:
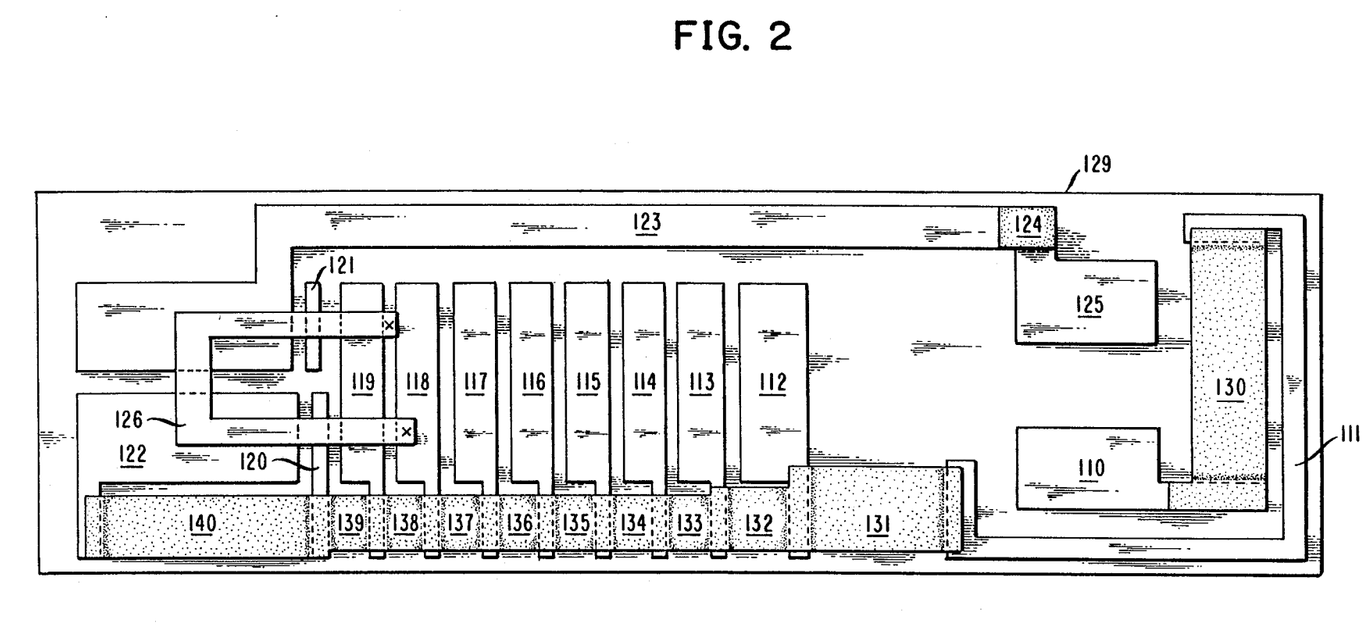
FIG. 2 is a top plan view of another preferred embodiment of the circuit of this invention on a substrate.

The circuit of this invention shown in FIG. 1 is on a ceramic substrate 29. In FIG. 1, the shape of the ceramic substrate 29 is not critical to the invention, however, in its preferred embodiments as shown in FIGS. 1 and 2, the substrate is generally rectangular in shape. Thick film technology is used to make the circuit. Thick film technology is the science of the formation of electrical high density miniature circuits on a supporting substrate. Film thicknesses are usually 10 micrometers or greater. Specially formulated resistor and conductor inks or pastes are applied as films to the ceramic substrates by screen-printing techniques. Other thick film techniques such as spraying and painting may also be used. The films are dried after printing, often at temperatures of about 100 degrees Celsius, and thereafter fired in air or nitrogen at a precise time-temperature profile for about 15 minutes to about an hour at about 750 degrees C. to 1000 degrees C. Resistor and conductor pastes normally consist of finely divided conductive phase, a finely divided glass phase, resins, solvents and small amounts of surfactants and wetting agents, such as described in Hybrid Microcircuits by I. Pratt, pages 7-75 to 7-81, and Integrated Circuits and Microprocessors, pages 8-16 to 8-17, Electronics Engineers' Handbook, D. G. Fink Editor, McGraw Hill Co. (1982).

Typical suitable ceramic substrates include alumina, normally 96% $Al_2O_3$, single crystal $Al_2O_3$(sapphire), beryllia(BeO), glasses, e.g. glass 7900(96% silica) as well as others such as ceramic-filled Teflon compounds and porcelain enamel steel; 96% alumina is preferred.

Typical suitable thick film conductor compositions includes noble metals such as Au, PtAu, PdAu, Ag, PdAg and Pt/Pd/Ag. PdAg compositions are preferred. Such thick film conductor compositions are available from E. I. DuPont De Nemours and Co. Inc. Photosystem and Electronic Products Dept., Wilmington, Del., Electro Science Labs, King of Prussia, PA and from Engelhard Corp., Edison, NJ. A particularly preferred thick film PdAg composition is ESL-9635P, a high performance, high adhesion, high wear resistant PdAg composition available from Electro Science Labs.

Typical suitable resistive components of resistor pastes include ruthenium oxide, palladium-palladium, oxide-silver compositions, mixtures of precious metals, thallium oxide, tungsten-tungsten carbide or tantalum-tantalum oxide. A ruthenium based resistor paste, e.g. Engelhard Series 3000 is normally used. Most thick film resistors must be trimmed or converted to the specified value by use of yttrium-aluminum-garnet(YAG) lasers or carbon dioxide lasers with the associated electronic computer controls.

The circuit is composed of a ground 10 which is electrically attached to a thick film contact pad conductor 12 through thick resistors 30 and 31 and conductor 11. The first contact pad 12 leads to a resistor segment 32 of the resistor area. The contact pads and resistor areas are applied to the substrate by the silk-screen technique using fine mesh stainless steel screen such as described hereinabove. The thick film contact pads 12 through 20 inclusive and resistor areas 30 through 40 inclusive are dried, fired and trimmed to a final desired value by one or more cuts with a YAG laser. The resistor segments 30 and 31 and conductor 11 connect ground 10 to the first conductor contact pad 12. Similarly, the resistor segment 32 connects contact pads 12 and 13. This pattern is repeated throughout series of contact pads to complete the circuit.. Resistor segments 30 through 40 and 24 are formed by overlaying a thick film resistance material, e.g. Engelhard Series 3000, a ruthenium-containing material, over extended ends of the contact pads already on the substrate, then fired and trimmed. A resistor area 24 adjacent switch 25 acts as a dam to prevent solder from flowing down conductor 23.

Figure 4:
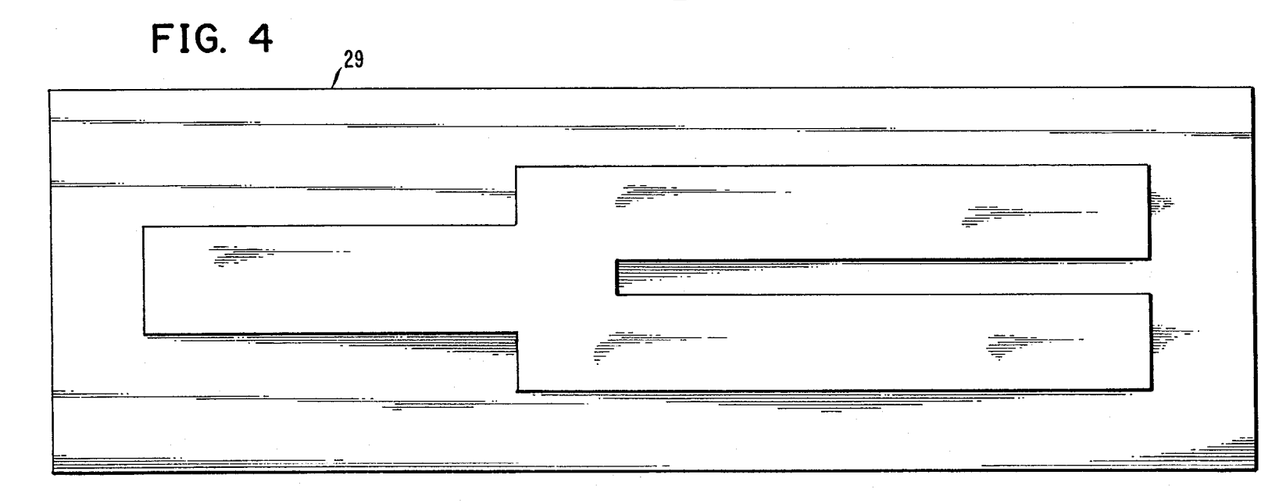
FIG. 4 is a bottom plan view of a preferred embodiment of the circuitry of FIGS. 1 and 3.

To use the sensor circuit of the present invention to measure e.g. oil pressure in an automobile motor crankcase, means for supplying an external potential and means for measuring the resistance are attached. The means for supplying an external potential comprises a switch 25 connected to one lead of a power source, e.g. a direct current battery which is then connected to the ground 10. The pressure is measured by a diaphragm which, in turn, is connected to a wiper arm means 26 in the general shape of a tuning fork having at least two discrete contact points, one on each tine of the wiper arm means 26. As shown in FIG. 1, the contact points 27 and 28 are on the tines near their terminus. Two contact points are preferred. A means for measuring resistance (not shown) is also connected to the circuit. In a preferred embodiment of the invention, the bottom face of the ceramic substrate 29 contains means for maintaining ground contact such as shown in FIG. 4.

The shapes of the conductors and resistor areas are not critical to this invention, although generally rectangular shapes are preferred. The configuration of the circuit can be any convenient configuration, i.e. straight, circular, and the like, as shown in FIGS. 1 and 2.

In a preferred embodiment of the circuit of the present invention, one or two resistors, preferably two, are inserted between one of the connecting means, either the ground 10 or the switch 25, with the ground 10 being preferred, and the first conductor contact pad 12. In the preferred embodiments of the circuit of this invention shown in FIGS. 1 and 2, two resistors 30 and 31 and 130 and 131, respectively, are used and have dimensions limited by the aspect ratio (length to width) and available surface area. The area between the first contact pad 12 and switch 25 and ground 10 is preferably left bare to prevent interference with the sweep of the wiper arm means 26. Within these constraints the surface areas of the two resistors, e.g. 30 and 31 are maximized to maximize the dissipation of heat generated at high current power (low resistance). In this way, damage to the circuit caused by such heat is minimized.

The shape of the resistors is not critical and one snakelike resistor or resistor of other designs well known to those skilled in the art may be substituted for resistors 30 and 31 as well as 130 and 131.

It is a special feature of the preferred embodiments of the circuits of the present invention shown in FIGS. 1 and 2 that all the resistor segments, i.e. 30 through 40 and 24, may be applied using one thick film paste on top of the conductor pads 12 through 20 and circuits conductors 10, 11, 23 and 25 in a single step. It is also possible to use more than one layer of thick film paste and more than one step, but such a variation is not preferred for economical reasons. The resistor segments 31 through 40 are overlaid on conductor 11, an extension of the ground 10 and contact pads 12 through 20 inclusive in such a way that each resistor segment is in contact with two adjacent contact pads. For example, as seen in FIG. 1, resistor segment 32 is in electrical contact with contact pads 12 and 13 and contact pad 13, for example, is in electrical contact with resistor segments 33 and 32.

The contact pads are made of high abrasion resistant palladium/silver alloy thick film paste. The contact pads and resistor areas are permanently attached to the ceramic substrate as explained above and then the resistor areas are trimmed with a YAG laser. A serpentine pattern is cut into resistor 40 to raise the resistance to the proper value.

Another preferred embodiment of the circuit of this invention is shown in FIG. 2. The circuit is composed of a ground 110 electrically connected to a conductor 111 and resistor 131 which is electrically connected directly to thick film contact pad conductor 112. In another less preferred embodiment of this invention (not shown), the resistors 130 and 131 may be replaced by any resistor conveniently used in thick film circuits or it may be removed entirely so that the ground 110 is directly electrically connected to a contact pad conductor 112. The first resistor segment 132 is connected to the second contact pad 113 which in turn is connected to the second resistor segment 133 and the remaining resistor segments, i.e. 134 through 140 are respectively connected to the remaining contact pads 114 through 120. The resistor segments 130 through 140 and 124 as well as contact pad conductors 112 through 120 and ground 110, switch 125 and pads 111, 121-123 are permanently affixed to substrate 129 by the screen-printing method described hereinabove.

When a means for supplying an external potential and means for measuring the resistances are attached, the pressure is measured by the wiper arm which sweeps from right to left. The circuits shown in FIGS. 1 and 2 are designed such that the resistance increases as the wiper arm moves from right to left.

Figure 3:
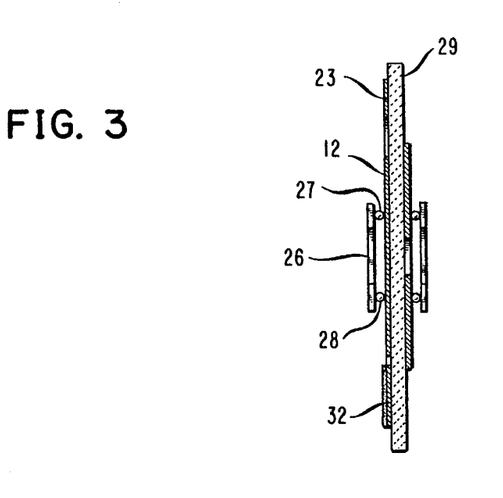
FIG. 3 is a side sectional view along line 3—3 of FIG. 1 seen in the direction of the arrows.

FIG. 4 illustrates the means for maintaining continuous electrical contact to ground. In operation, electrical contact is made to ground 10 of the circuit of FIG. 1 and to a meter for measuring resistance (not shown). The other contact from the meter is to the ground circuit of FIG. 4 disposed on the bottom of the circuit of FIG. 1. FIG. 3 illustrates a side sectional view of a tuning fork shaped wiper arm contact means sweeping the top of the circuit shown and in electrical connection to a tuning fork shaped wiper arm contact means sweeping the bottom of the circuit shown in FIG. 4. The tuning fork shaped wiper arm contact means 26 having a contact point 27 and 28 on each of its tines moves from right to left across the circuit illustrated in FIG. 1.

Figure 5A:
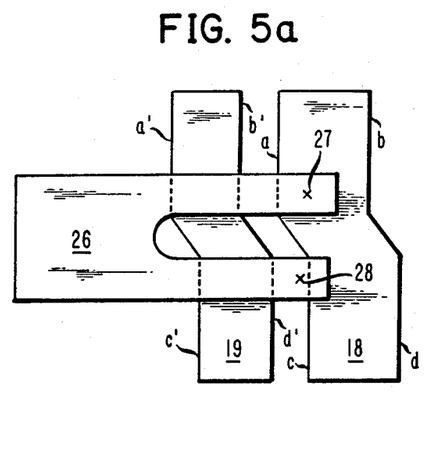
FIGS. 5a and 5b illustrate operation of the circuit of FIG. 4.
Figure 5B:
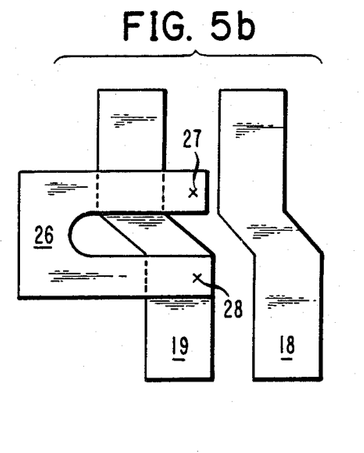
Figure 6A:
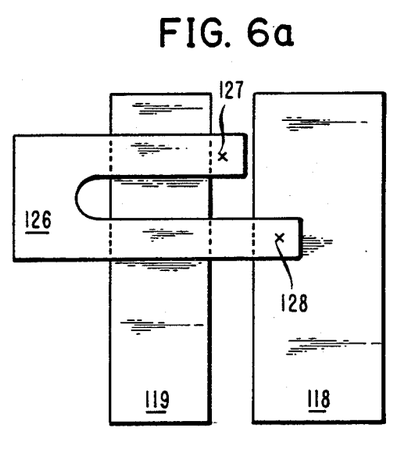
FIGS. 6a and 6b illustrate operation of the circuit of FIG. 2.
Figure 6B:
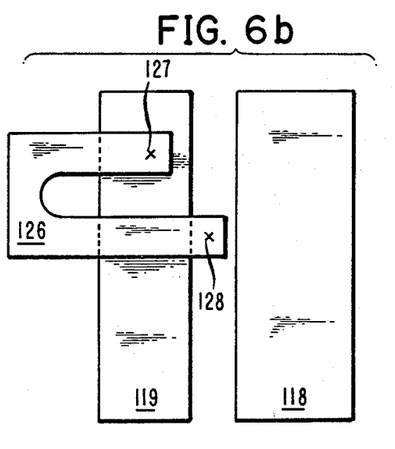
Figure 7A:
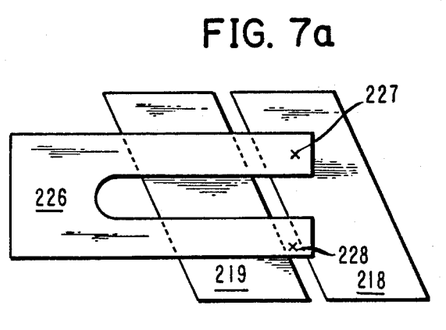
FIGS. 7a and 7b illustrate operation of another preferred embodiment of the circuit of this invention.
Figure 7B:
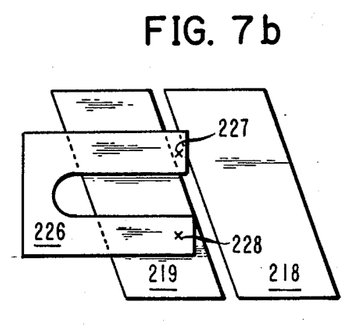

Contact points 27 and 28 define a straight line x—x set in a plane parallel to the planes defined by the vertical sides of conductors 12 through 20. The conductor contact pads 12 through 19 have two sets of two sides, e.g. a and b and c and d of 18 in FIG. 5a, which are set in four separate planes which are substantially parallel to one another. As shown in FIG. 5a, sides a and c of conductor 18 are offset from one another at a distance from one another so that side a of conductor 18 and d' of conductor 19 define substantially the same plane. Thus, when the tuning fork shaped wiper arm means 26 moves to the left, contact point 28 was off conductor pads 18 and 19 in FIG. 5a is now on conductor pad 19 while contact point 27 in electrical contact with conductor pad 18 in FIG. 5a falls in between conductors 18 and 19 in FIG. 5b. In this way as the wiper arm 26 sweeps across the circuitry of FIG. 1, there is maintained continuous electrical contact between at least one of contact points 27 or 28 of wiper arm 26 and one of contact pads 12-20. Pad 21 is provided on face of ceramic substrate 29 to minimize wear on contact points 27 and 28 caused by contact with the ceramic substrate which is abrasive.

FIGS. 6a and 6b and FIGS. 7a and 7b illustrate another embodiment of the means to maintain continuous electrical contact between at least one contacting point means and at least one contact pad. Other modifications in the shape of the contact pads and the arrangement of the contacting points relative to such contact pads may be made without deviation from the scope of the invention.

A specific embodiment of the preparation of a circuit of the invention follows:

A ground and switch pad, two contact pads and ten(10) contact pads are placed on a ceramic substrate made of 96% alumina by silk-screening, using thick-film technology. The contact pads are made of high abrasion wear resistant palladium/silver alloy thick film paste and are silk-screened onto the ceramic substrate which is about 0.025 inches thick. The contact pads have 0.010 inch gaps between them. Small extensions are made onto the ends of the contact pads to make connection to the resistor area. It is a special feature of the present invention that the resistor areas are applied in one operation.

Resistor areas are placed adjacent to the contact areas and consist of thick film resistor material, e.g. ruthenium-containing material (Engelhard Series 3000). The resistor areas are sufficiently long to cover all the extensions of the contact pads and are sufficiently wide to extend beyond the end of the contact pad extensions and allow appropriate trim to final values using a YAG laser.

Typical final resistance values are listed in the following table. A serpentine pattern is cut into resistor 40 to produce the final desired resistance.

| RESISTANCE ELEMENT | TOTAL RESISTANCE(OHM) TO GROUND |
|---|---|
| 30 | 18 |
| 31 | 28 |
| 32 | 33 |
| 33 | 36 |
| 34 | 39 |
| 35 | 42 |
| 36 | 45 |
| 37 | 48 |
| 38 | 51 |
| 39 | 54 |
| 40 | 101 |

Modification such as variations in the resistance values and in the shape of the conductor pads as well as the gaps therebetween may be made without deviating from the scope of the present invention.

In operation when the circuit is used to monitor oil pressure in the crankcase of an automobile, for example, a wiper arm moving in response to the pressure of the oil in the crankcase sweeps continuously across the contact pads 12 through 20 depicted in FIG. 1. If a source of external potential, normally direct current, is applied across the ground and the wiper arm blade, the circuit converts the wiper arm position to a resistance value which can be correlated with crankcase pressure by use of a standard measuring device. When contact points 27 and 28 touch pads 22 and 23, an alarm or a switch or a warning light may be activated to indicate unacceptably low oil pressure.

I claim:

1. An electrical sensor circuit with resistors, contact pad conductors on a front face of a ceramic substrate, a connecting means for applying an external potential source comprising a wiper arm means and a means for maintaining continuous electrical contact between the wiper arm means and the contact pad conductors, which comprises:

(a) a substrate comprised of a ceramic material having a front face and a back face; and (b) a circuit permanently attached to the front face of said substrate comprising (i) connecting means for applying an external potential source comprising a wiper arm means having contacting point means; (ii) contact pads as conductors for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors comprising the wiper arm means in the shape of a tuning fork having at least two discrete tines each having a contacting point means defining a straight vertical line set in the horizontal plane of the front face of the substrate, said substrate having at least two adjacent conductors, each having the same irregular shape wherein the side edges thereof are equidistant, each conductor being at a distance from an adjacent conductor sufficient to maintain continuous electrical contact between at least one of the contacting points and at least one of the conductors; and (v) means for measuring resistance.

2. An electrical sensor circuit of claim 1 wherein the substrate is 0.025 inches thick alumina.

3. A sensor circuit of claim 1 wherein the contact pads are high abrasion wear resistant palladium/silver alloy.

4. A sensor circuit of claim 1 wherein the resistors comprise ruthenium-containing material.

5. A sensor circuit of claim 1 adapted for use in a fluid containing closed chamber.

6. A sensor circuit of claim 5 wherein said fluid containing closed chamber is a crankcase of an automobile.

7. A sensor circuit of claim 1 wherein a means to maintain continuous electrical ground attachment is permanently affixed to the back face of said ceramic substrate.

8. An electrical sensor circuit with resistors, contact pad conductors on a front face of a ceramic substrate, a connecting means for applying an external potential source comprising a wiper arm means and a means for maintaining continuous electrical contact between the wiper arm means and the contact pad conductors, which comprises:
  (a) a substrate comprised of a ceramic material having a front face and a back face; and
  (b) a circuit permanently attached to the front face of said substrate comprising (i) connecting means for applying an external potential source comprising a wiper arm means having contacting point means; (ii) contact pads as conductors for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors comprising the wiper arm means in the shape of a tuning fork having at least two discrete tines each having a contacting point means defining a straight vertical line set in the horizontal plane of the front face of the substrate, said substrate having at least two adjacent conductors, each having the same irregular shape wherein the side edges thereof are equidistant, each conductor being at a distance from an adjacent conductor sufficient to maintain continuous electrical contact between at least one of the contacting points and at least one of the conductors; (v) one or two resistor segments connecting one of said connecting means and the first of said conductor contact pads; and (vi) means for measuring resistance.

9. An electrical sensor circuit of claim 8 wherein the substrate is about 0.025 inches thick alumina.

10. a sensor circuit of claim 8 wherein the contact pads are high abrasion-wear resistant palladium/silver alloy.

11. A sensor circuit of claim 8 wherein the resistors comprise ruthenium-containing material.

12. A sensor circuit of claim 8 adapted for use in a fluid containing closed chamber.

13. A sensor circuit of claim 8 wherein one resistor connects one of said connecting means to the first of said contact pads.

14. A sensor circuit of claim 8 wherein two resistors connect one of said connecting means to the first of said contact pads.

15. A sensor circuit of claim 8 wherein a means to maintain continuous electrical ground attachment is permanently affixed to the back face of said ceramic substrate.

16. An electrical sensor circuit with resistors, contact pad conductors on a front face of a ceramic substrate, a connecting means for applying an external potential source comprising a wiper arm means and a means for maintaining continuous eletrical contact between the wiper arm means and the contact pad conductors, which comprises:
  (a) a substrate comprised of a ceramic material having a front face and a back face; and
  (b) a circuit permanently attached to the front face of said substrate comprising (i) connecting means for applying an external potential source comprising a wiper arm means having contacting point means; (ii) contact pads as conductors for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors comprising the conductors each in the shape of regular polygons comprising at least two straight vertical and parallel sides set in a horizontal plane parallel to the horizontal plane of the front face of the substrate and a wiper arm means in the shape of a tuning fork having at least two discrete tines each having a contacting point means defining a straight line at a non-vertical angle to said straight, vertical and parallel sides of the conductors, each conductor being at a distance from an adjacent conductor sufficient to maintain continuous electrical contact between at least one of the contacting points and at least one of the conductors; and (v) means for measuring resistance.

17. An electrical sensor circuit of claim 16 wherein the substrate is about 0.025 inches thick alumina.

18. A sensor circuit of claim 16 wherein the contact pads are high abrasion-wear resistance palladium/silver alloy.

19. A sensor circuit of claim 16 wherein the resistors comprise ruthenium-containing material.

20. A sensor circuit of claim 16 adapted for use in a fluid containing closed chamber.

21. A sensor circuit of claim 20 wherein the fluid containing closed chamber is an automobile crankcase.

22. An electrical sensor circuit with resistors, contact pad conductors on a front face of a ceramic substrate, a connecting means for applying an external potential source comprising a wiper arm means and a means for maintaining continuous eletrical contact between the wiper arm means and the contact pad conductors, which comprises:

(a) a substrate comprised of a ceramic material having a front face and a back face; and (b) a circuit permanently attached to the front face of said substrate comprising (i) connecting means for applying an external potential source comprising a wiper arm means having contacting point means; (ii) contact pads as conductors for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors comprising the conductors each in the shape of regular polygons comprising at least two straight non-vertical and parallel sides set in a horizontal plane parallel to the horizontal plane of the front face of the substrate and a wiper arm means in the shape of a tuning fork having at least two discrete tines each having a contacting point means defining a straight vertical line relative to said straight non-vertical and parallel sides of the conductors set in a horizontal plane parallel to the horizontal plane of the front face of the substrate, each conductor being at a distance from an adjacent conductor sufficient to maintain continuous electrial contact between at least one contacting point means and at least one conductor; and (v) means for measuring resistance.

23. An electrical sensor circuit of claim 22 wherein the substrate is about 0.025 inches thick alumina.

24. A sensor circuit of claim 22 wherein the contact pads are high abrasion-wear resistant palladium/silver alloy.

25. A sensor circuit of claim 22 wherein the resistors comprise ruthenium-containing material.

26. A sensor circuit of claim 22 adapted for use in a fluid containing closed chamber.

27. A sensor circuit of claim 26 wherein the fluid containing closed chamber is an automobile crankcase.

28. An electrical sensor circuit with resistors, contact pad conductors on a front face of a ceramic substrate, a connecting means for applying an external potential source comprising a wiper arm means and a means for maintaining continuous eletrical contact between the wiper arm means and the contact pad conductors, which comprises:

(a) a substrate comprised of a ceramic material having a front face and a back face; and (b) a circuit permanently attached to the front face of said substrate comprising (i) connecting means for applying an external potential source comprising a wiper arm means having contacting point means; (ii) contact pads as conductors for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors comprising the conductors each in the shape of regular polygons comprising at least two straight non-vertical and parallel sides set in a horizontal plane parallel to the horizontal plane of the front face of the substrate and a wiper arm means in the shape of a tuning fork having at least two discrete tines each having a contacting point means defining a straight vertical line relative to said straight non-vertical and parallel sides of the conductors set in a horizontal plane parallel to the horizontal plane of the front face of the substrate, each conductor being at a distance from an adjacent conductor sufficient to maintain continuous electrial contact between at least one contacting point means and at least one conductor; and (v) one or two resistor segments connecting one of said connecting means and the first of said conductor contact pads; and (vi) means for measuring resistance.

29. An electrical sensor circuit of claim 28 wherein the substrate is about 0.025 inches thick alumina.

30. A sensor circuit of claim 28 wherein the contact pads are high abrasion-wear resistant palladium/silver alloy.

31. A sensor circuit of claim 28 wherein the resistors comprise ruthenium-containing material.

32. A sensor circuit of claim 28 adapted for use in a fluid containing closed chamber.

33. A sensor circuit of claim 28 wherein one resistor connects one of said connecting means to the first of said contact pads.

34. A sensor circuit of claim 28 wherein two resistors connect one of said connecting means to the first of said contact pads.

35. An electrical sensor circuit with resistors, contact pad conductors on a front face of a ceramic substrate, a connecting means for applying an external potential source comprising a wiper arm means and a means for maintaining continuous eletrical contact between the wiper arm means and the contact pad conductors, which comprises:

(a) a substrate comprised of a ceramic material having a front face and a back face; and (b) a circuit permanently attached to the front face of said substrate comprising (i) connecting means for applying an external potential source comprising a wiper arm means having contacting point means; (ii) contact pads as conductors for the wiper arm means permanently attached to the front face of said ceramic substrate and in electrical attachment to said connecting means and said resistors; (iii) a high density of resistor segments permanently attached to the front face of said substrate and in electrical attachment with said contact pads; (iv) means for maintaining continuous electrical attachment between at least one contacting point means of the wiper arm means and at least one of said conductors comprising the conductors each in the shape of regular polygons comprising at least two straight vertical and parallel sides set in a horizontal plane parallel to the horizontal plane of the front face of the substrate and a wiper arm means in the shape of a tuning fork having at least two discrete tines each having a contacting point means defining a straight line at a non-vertical angle to said straight vertical and parallel sides of the conductors set in a horizontal plane parallel to the horizontal plane of the front face of the substrate, each conductor being at a distance from an adjacent conductor sufficient to maintain continuous electrial contact between at least one contacting point means and at least one conductor; and (v) one or two resistor segments connecting one of said connecting means and the first of said conductor contact pads; and (vi) means for measuring resistance.

36. An electrical sensor circuit of claim 35 wherein the substrate is about 0.025 inches thick alumina.

37. A sensor circuit of claim 35 wherein the contact pads are high abrasion-wear resistant palladium/silver alloy.

38. A sensor circuit of claim 35 wherein the resistors comprise ruthenium-containing material.

39. A sensor circuit of claim 35 adapted for use in a fluid containing closed chamber.

40. A sensor circuit of claim 35 wherein one resistor connects one of said connecting means to the first of said contact pads.

41. A sensor circuit of claim 35 wherein two resistors connect one of said connecting means to the first of said contact pads.

* * * * *